United States Patent [19]

Landau et al.

[11] Patent Number: 5,043,232
[45] Date of Patent: Aug. 27, 1991

[54] FUEL PREHEATING FOR A FUEL PROCESSING SYSTEM OF A FUEL CELL POWER PLANT

[75] Inventors: Michael B. Landau, West Hartford; Yasar B. Tanrikut, Manchester, both of Conn.

[73] Assignee: International Fuel Cells Corporation, South Windsor, Conn.

[21] Appl. No.: 521,481

[22] Filed: May 10, 1990

[51] Int. Cl.⁵ .............................................. H01M 8/02
[52] U.S. Cl. ........................................ 429/13; 429/17; 429/20
[58] Field of Search ............................ 429/26, 13, 20

[56] References Cited

U.S. PATENT DOCUMENTS

| | | | |
|---|---|---|---|
| 3,553,023 | 1/1971 | Doyle | 429/13 |
| 4,582,765 | 4/1986 | Kothmann | 429/26 |
| 4,994,331 | 2/1991 | Cohen | 429/26 |

Primary Examiner—Donald L. Walton
Attorney, Agent, or Firm—Edward L. Kochey, Jr.

[57] ABSTRACT

Heat exchanger 4 operates in counterflow relationship to cool reformed gas and to heat raw gas during operation with gaseous raw fuel feed. It also operates in counterflow relationship when preheating the system while recirculating inert gas. This same heat exchanger 4 operates in parallel flow relationship when liquid raw fuel is to be vaporized. Only one heat exchanger is required while avoiding cracking and fouling in the heat exchanger.

4 Claims, 2 Drawing Sheets

FUEL PREHEATING FOR A FUEL PROCESSING SYSTEM OF A FUEL CELL POWER PLANT

TECHNICAL FIELD

The invention relates to fuel cell power generation systems and in particular to a fuel processing system suited for both gas and liquid fuels.

BACKGROUND OF THE INVENTION

The fuel cells of a fuel cell power plant operate on gaseous fuel. Where the raw fuel is itself gaseous it is preheated in a heat exchanger as it enters the fuel processing system. The heat is supplied by gaseous effluent from the reformer. These heat exchangers are designed for counterflow heat transfer whereby the maximum heat transfer is achieved with minimum surface.

The various components of the fuel processing system must be preheated before operation of the plant. Conventionally an inert gas is introduced into the system where heat is supplied by firing in the reformer. This inert gas is recycled through the system, being cooled in a heat exchanger to prevent overheating of some of the low temperature components. The same heat exchanger as is used for heating the fuel is used to both cool this gas upstream of the low temperature components, and to partially reheat the gas as it is recycled to the high temperature components. The previously described counterflow relationship is ideal for this since it achieves maximum efficiency of the heat exchanger.

On occasions, however, it is desirable to operate a fuel cell plant with a liquid raw fuel feed. If such fuel is introduced in counterflow relationship with the high temperatures encountered at the reformer outlet, there is potential for fuel cracking and heat exchanger fouling. Conventional systems have used a second heat exchanger to perform this duty.

SUMMARY OF THE INVENTION

It is an object of this invention to avoid the necessity of two heat exchangers on a dual fuel power plant. This is accomplished by arranging the heat exchanger so that it may selectively operate in parallel flow or counterflow relationship.

DESCRIPTION OF THE PREFERRED EMBODIMENT

Figure 1:
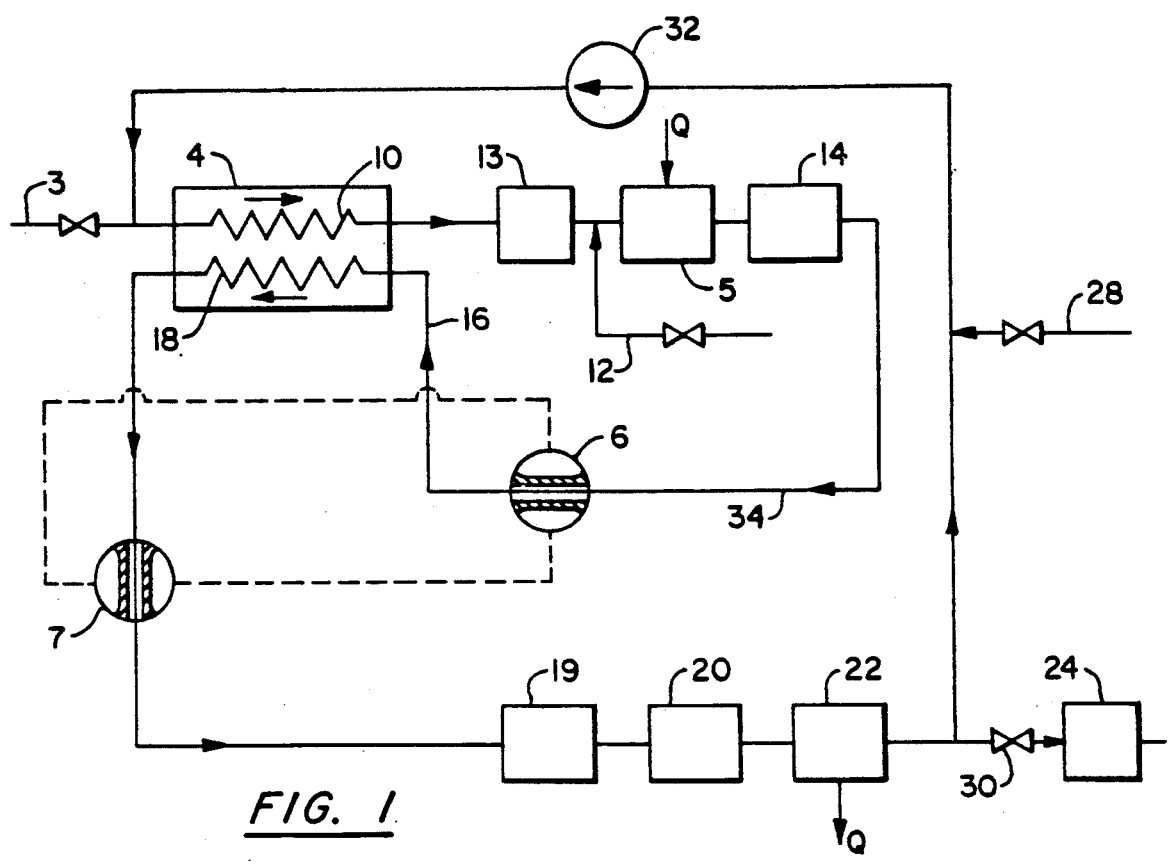
FIG. 1 is a schematic illustration of the fuel cell power plant and the fuel preheating arrangement showing the heat exchanger operation when gas is being heated or when the system is processing a gaseous feedstock.

Referring to FIG. 1 which illustrates operation on gaseous fuel, raw gas enters through line 3 is mixed with recycled gas flows to the two-way heat exchanger 4 and through second pass 10. The preheated gas passes through hydrodesulfurizer 13 is mixed with steam introduced through valve 12 and flows to a fired gas reformer 5 where heat is added to reform the gas. The hot gas then passes through a high temperature shift converter 14 and through transfer valves 6 into line 16 and through first pass 18 of a heat rejecting heat exchanger 4 in counterflow relationship with second pass 10.

The cooled gas passes through changeover valve 7 to heat exchanger 19 for preheating air for reformer 5. It then passes to low temperature shift converter 20 and cooler 22 in which a portion of the moisture is removed.

The gas then passes to fuel cell 24.

Before operating the plant it is required that the hydrodesulfurizer and the shift converters be preheated. For this purpose an inert gas is charged through line 28 into the system with valves 12 and 30 being closed. Blower 32 recycles this inert gas through the fuel treatment train.

Heat exchanger 4 is again operated with the second pass 10 being in counterflow relationship with the first pass 18. This maintains the maximum efficiency of the heat exchanger thereby minimizing the amount of heat rejected from cooler 22 and heat added in the reformer 5.

Figure 2:
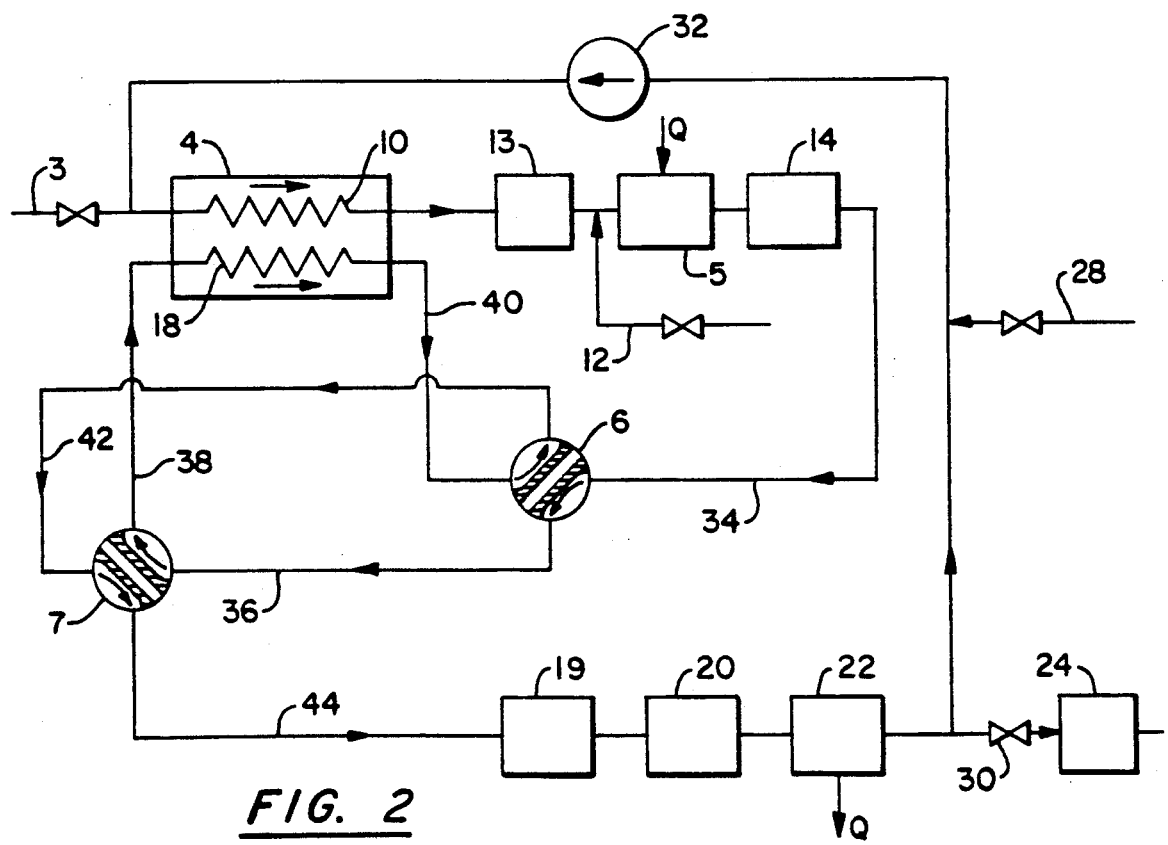
FIG. 2 is a schematic illustration of the fuel cell power plant when liquid is being vaporized in the heat exchanger.

When it is desired to operate on a liquid raw fuel such as naphtha, the heat exchanger operation is changed as illustrated in FIG. 2. The raw fuel enters through line 3 into heat exchanger 4 where it again enters first pass 10. The fuel in passing through the heat exchanger is vaporized and superheated. The gaseous effluent from the heat exchanger 4 passes again through components 13, 5 and 14 of the fuel processing train and passes to changeover valve 6. In this case changeover valve is switched to the illustrated position where the flow through line 34 is switched over to line 36 passing through changeover valve 7 passing to line 38. It then passes through first pass 18 of the heat exchanger in the reverse direction returning to changeover valve 6 to line 40.

This flow is routed to line 42 to changeover valve 7 where it returns to the original loop passing to line 44 to the remainder of the fuel process train. This places the liquid phase of the naptha in contact with the cooler gas. Overheating of the film of liquid on the heat exchanger surface is avoided, thereby avoiding fouling and cracking of the fuel.

Figure 3:
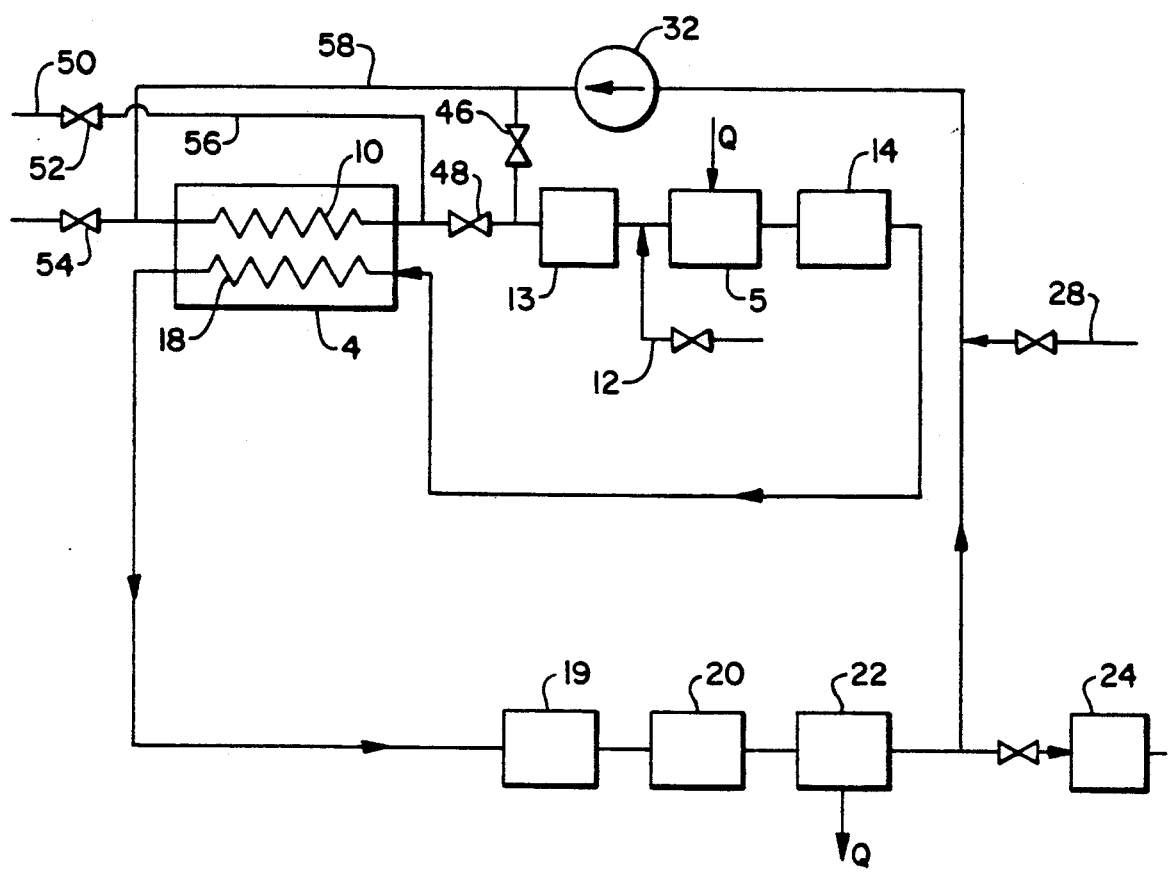
FIG. 3 shows the flow direction reversal on the raw fuel side.

FIG. 3 illustrates an alternate embodiment where the flow reversal is accomplished on the raw fuel side of the two-way heat exchanger 4. Preheating of the system of inert gas from line 28 is accomplished as previously described, but with valve 46 closed and valve 48 open.

Liquid raw fuel is introduced from line 50. Liquid fuel valve 52 and gas fuel valve 54 are in this case functional equipment of the first changeover valve 6.

The liquid fuel passes through line 56 where with valve 48 closed it passes through the second pass 10 of the heat exchanger in the reverse direction affecting parallel flow heat transfer with the gas passing through the first pass 18. The now vaporized liquid passes as a gas through line 58 and through now open valve 46 to the hydrodesulfurizer 13 and hence to the remainder of the fuel processing system.

Valves 46 and 48 are the functional equivalent of the second changeover valve 7.

What is claimed is:

1. A method of operating a dual fuel fuel cell power plant comprising:
    recycling inert gas serially through a fired gas reformer, a first pass in a two-way heat exchanger, a heat rejecting heat exchanger, a blower, a second pass in said two-way heat exchanger in counterflow relationship with said first pass, and returning said inert gas to said reformer, while preheating the components of the power plant in preparation for operation;

operating said power plant on gaseous fuel including passing hot reformed fuel from said reformer through a first pass in said two-way heat exchanger and passing raw gaseous fuel through a second pass in said two-way heat exchanger in counterflow relationship with said first pass; and alternately operating said power plant on liquid fuel including passing hot reformed fuel from said reformer through a first pass in said two-way heat exchanger, and passing raw liquid fuel through a second pass in said heat transfer exchanger in parallel flow relationship with said first pass to vaporize said liquid fuel.

2. A fuel preheating system for fuel cells comprising:
a heat exchanger having a first pass fluid flow path and a second pass fluid flow path, said first pass fluid flow path and said second pass fluid flow path being in heat exchange relationship;

means for passing a gaseous fuel through said first pass;

means for passing hot gas through second pass in counterflow heat transfer relationship with said first pass;

means for reversing the direction of flow of one of said first path and second path and passing liquid fuel in heat exchange relationship with said hot gas in parallel flow relationship.

3. A fuel preheating system as in claim 2 wherein said means for reversing the direction of flow comprises:
means for reversing the flow direction through said first pass.

4. A fuel preheating system as in claim 2 wherein said means for reversing the direction of flow comprises:
means for reversing the flow direction through said second pass.

* * * * *